United States Patent
Uyttendaele et al.

(10) Patent No.: US 6,701,030 B1
(45) Date of Patent: Mar. 2, 2004

(54) DEGHOSTING PANORAMIC VIDEO

(75) Inventors: Matthew T. Uyttendaele, Seattle, WA (US); Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 609 days.

(21) Appl. No.: 09/612,830

(22) Filed: Jul. 7, 2000

(51) Int. Cl.[7] .............................. G06K 9/36; G06K 9/32; G06K 9/54; H04N 7/00; G03B 37/04

(52) U.S. Cl. .................. 382/284; 382/294; 382/304; 348/36; 352/70

(58) Field of Search .......................... 382/154, 268, 382/284, 294, 302, 303, 304, 305; 348/36, 42, 47, 48, 580, 614; 352/69, 70

(56) References Cited

U.S. PATENT DOCUMENTS

| | | | | |
|---|---|---|---|---|
| 4,463,380 A | * | 7/1984 | Hooks, Jr. .................. | 348/580 |
| 5,649,032 A | * | 7/1997 | Burt et al. .................. | 382/284 |
| 5,963,664 A | * | 10/1999 | Kumar et al. ............... | 382/154 |
| 5,986,668 A | | 11/1999 | Szeliski et al. ............. | 345/634 |
| 5,987,164 A | | 11/1999 | Szeliski et al. ............. | 382/154 |
| 6,018,349 A | | 1/2000 | Szeliski et al. ............. | 345/629 |
| 6,389,179 B1 | * | 5/2002 | Katayama et al. ........... | 382/284 |
| 6,522,787 B1 | * | 2/2003 | Kumar et al. ............... | 382/268 |

OTHER PUBLICATIONS

Shum et al, Construction and Refinement of Panoramic Mosaics with Global and Local Alignment, Jan. 1998, IEEE, Sixth International Conference on Computer Vision, pp. 953–958.*

Richard Szeliski, Image Mosaicing for Tele–Reality Applications, 1994, IEEE, ISBN: 0–8186–6410, pp. 44–53.*

* cited by examiner

*Primary Examiner*—Mehrdad Dastouri
(74) *Attorney, Agent, or Firm*—Lyon & Harr, LLP; Richard L. Lyon

(57) ABSTRACT

A system and process for deghosting mosaiced images created by stitching together images of a scene captured from different viewpoints is presented. When images are mosaiced, which were captured by different cameras at different viewpoints, the possibility of localized double images of objects exists. Essentially, this double imaging or ghosting will occur if an object in the scene is close in to the cameras capturing the images. However, this localized ghosting can be compensated for by estimating the amount of local mis-registration and then locally warping each image in the mosaiced image to reduce any ghosting.

9 Claims, 4 Drawing Sheets

DEGHOSTING PANORAMIC VIDEO

BACKGROUND

1. Technical Field

The invention is related to deghosting mosaiced images, and more particularly to a system and process for deghosting a mosaiced image of a scene produced by stitching together overlapping images of the scene, each of which was captured by a different camera from a different viewpoint.

2. Background Art

Typically, mosaiced images, such as a panorama mosaic, are created by stitching together images taken by a single camera at a fixed viewpoint that is rotated to capture images of the surrounding scene. However, more recently, such mosaics, and particularly panoramic mosaics, have been created using a series of cameras each capturing a different part of the surrounding scene from a different viewpoint. This type of system for capturing images and creating mosaiced images by stitching the corresponding images captured by the respective cameras has been employed in the authoring of panoramic videos. In such a system, the cameras are video cameras and the images captured by the cameras at the same moment in time are stitched together to form a frame of the panoramic video.

A particular problem associated with stitching images together that were captured by different cameras at different viewpoints is localized double images of objects in the scene, which is often referred to as parallax distortion or ghosting. While it is irrelevant for objects in the scene that are far away from the cameras, objects that are closer in can create a double image in the mosaiced image. It is akin to a person bringing an object closer and closer to their eyes. At some point the object appears as two instead of one because the person's eyes are viewing it from different viewpoints. In the context of a mosaiced image, a close-in object depicted in two of the images captured at different viewpoints will result in a double image in the overlap region of these images in mosaiced image. This problem can be particularly acute in the creation of a panoramic video as objects will typically move in and out of the scene and may come close enough to the camera rig to cause the aforementioned localized double image. Up to this time no provision has been made to compensate for this double imaging problem, with the exception of eliminating any close in objects in the scene. The present deghosting technique addresses this problem without necessitating the elimination of close in objects.

SUMMARY

The present invention is directed toward a system and process for deghosting mosaiced images created by stitching together images of a scene captured from different viewpoints. As discussed above, when images are stitched together (i.e., mosaiced) that were captured by different cameras at different viewpoints, the possibility of localized double images of objects exists. Essentially, this double imaging or ghosting will occur if an object in the scene is close in to the cameras capturing the images. However, in accordance with the present invention this localized ghosting can be compensated for by estimating the amount of local mis-registration and then locally warping each image in the mosaiced image to reduce any ghosting. Preferably, this is accomplished using the procedures described in U.S. Pat. No. 5,986,668 entitled "Deghosting Method and Apparatus for Construction of Image Mosaics", the disclosure of which is hereby incorporated by reference. This method was developed to reduce distortions caused by the fact that typical mosaicing processes assume an idealized camera model. However, in actuality un-modeled radial distortion (i.e., that component of the radial distortion that cannot be adequately modeled in the mosaicing process), tangential distortion, and non-square pixel distortion, among others can cause the local mis-registrations which can be corrected for using the aforementioned method. The same procedures employed to reduce these types of distortion can be adapted to reduce ghosting as well. Essentially, the deghosting process involves computing the optical flow between all pairs of images, and inferring the desired local warps from these computations.

The foregoing deghosting technique is particularly useful in the context of generating panoramic video using a non-catadioptric, multi-camera panoramic video authoring system, when employed on a frame by frame basis. As mentioned previously, these types of authoring systems use a series of video cameras to capture different parts of the surrounding scene from different viewpoints. In such a system, the images captured by the cameras at the same moment in time are stitched together to form a frame of the panoramic video. However, objects will typically move in and out of the scene and may come close enough to the camera rig to cause the aforementioned localized double image. Given this, each mosaiced frame of the panoramic video would be deghosted in accordance with the present technique to reduce the localized mis-alignments that are responsible for the ghosting.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
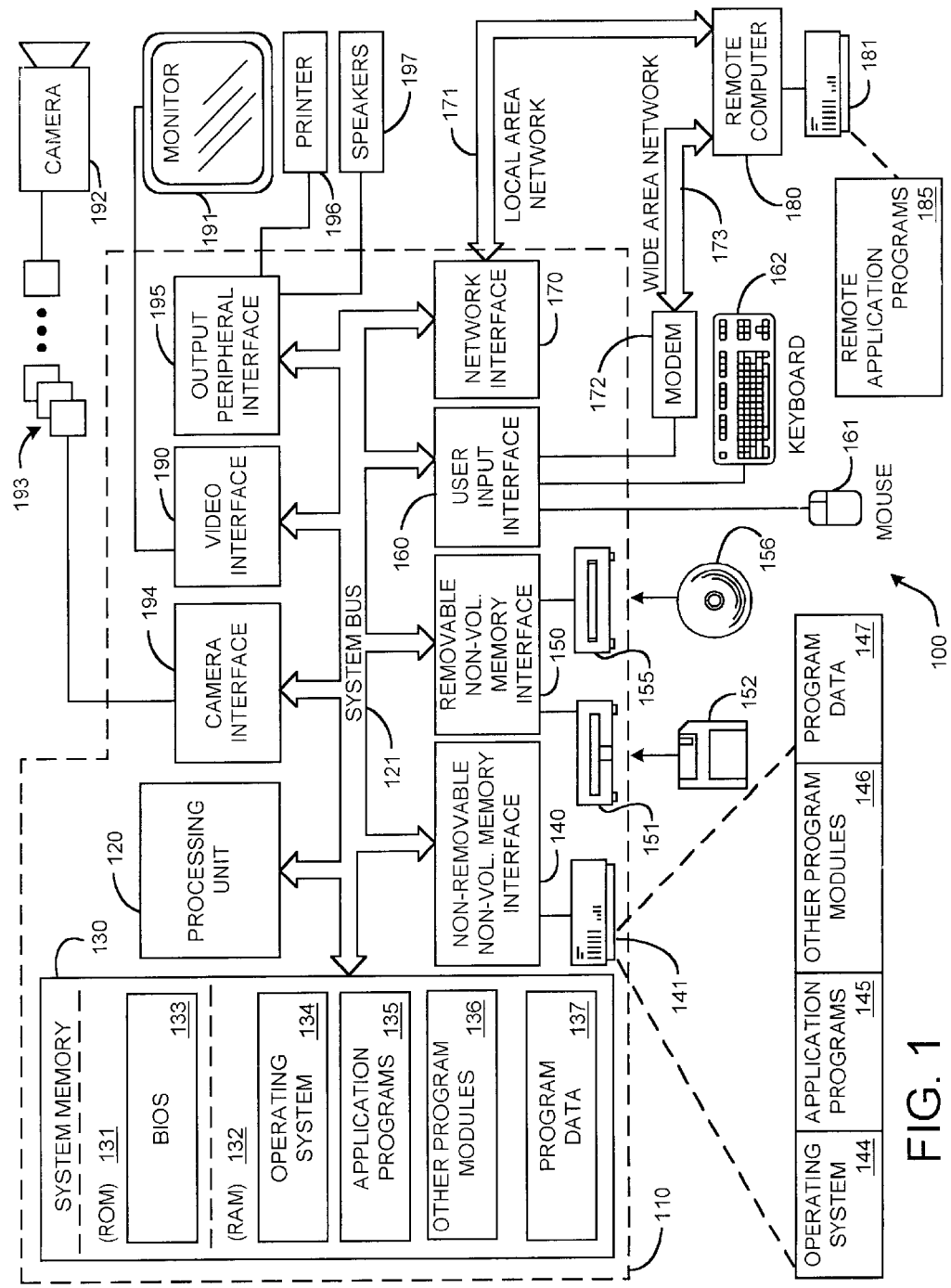
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions,. data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
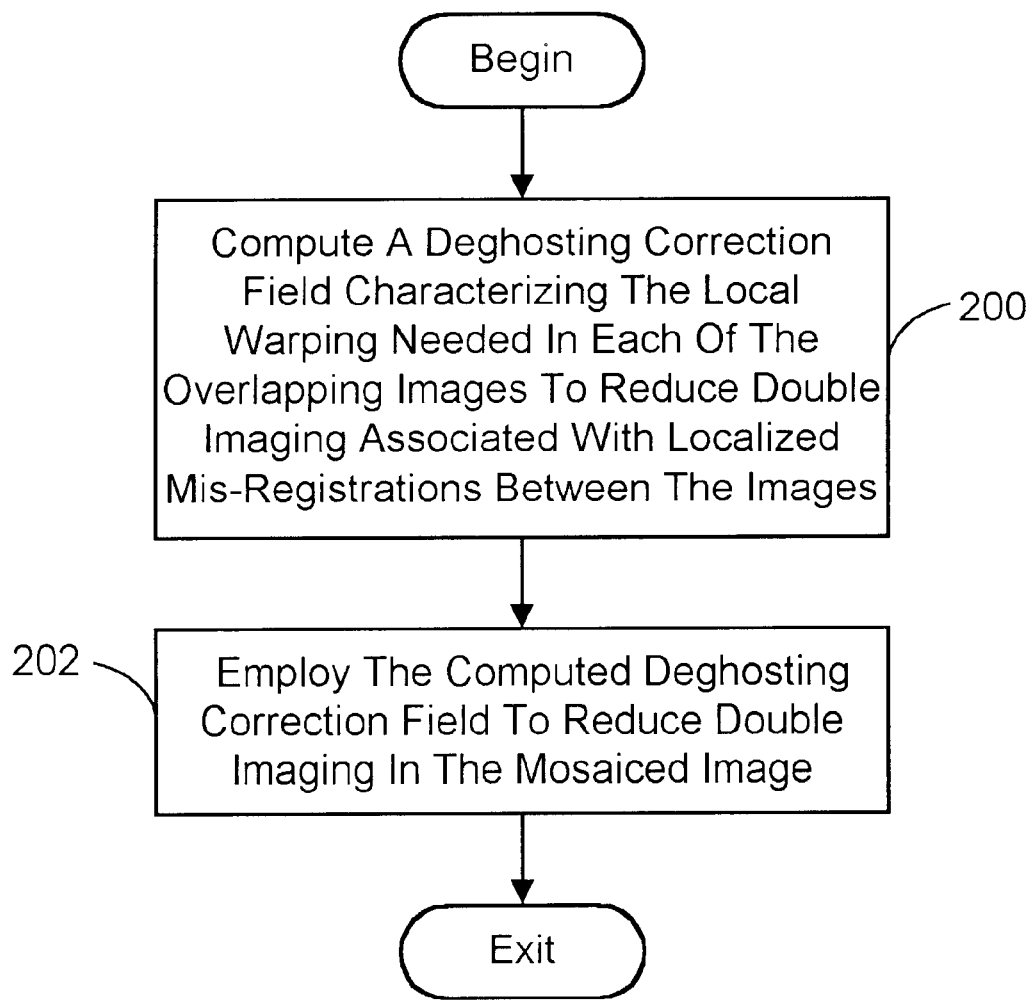
FIG. 2 is a flow chart diagramming an overall process for deghosting a mosaiced image of a scene that was produced by stitching together overlapping images of the scene, each of which was captured by a different camera from a different viewpoint.

The exemplary operating environment having now been discussed, the remaining part of this description section will be devoted to a description of the program modules embodying the invention. Generally, the system and process according to the present invention involves deghosting a mosaiced image of a scene that was produced by stitching together overlapping images of the scene, each of which was captured by a different camera from a different viewpoint. In general, this is accomplished via the following process actions, as shown in the high-level flow diagram of FIG. 2:
  a) computing a deghosting correction field that characterizes the local warping needed in each of the overlapping images to reduce any double imaging associated with localized mis-registrations between the images (process action 200); and,
  b) employing the computed deghosting correction field to reduce any double imaging in the mosaiced image (process action 202).

The need for employing the foregoing deghosting technique arises because when images are stitched together (i.e., mosaiced), which were captured by different cameras from different viewpoints, the possibility of localized double images of objects exists. This double imaging or ghosting will occur if an object in the scene is close in to the cameras capturing the images. However, in accordance with the present invention the localized ghosting can be compensated for by estimating the amount of local mis-registration and then locally warping each image in the mosaiced image to reduce the ghosting. The procedure used to perform the deghosting is preferably that described in U.S. Pat. No. 5,986,668 entitled "Deghosting Method and Apparatus for Construction of Image Mosaics", the disclosure of which is hereby incorporated by reference. This method was developed to reduce distortions caused by the fact that typical mosaicing processes using images captured with a single camera at approximately the same viewpoint, assume an idealized camera model. However, in actuality un-modeled radial distortion (i.e., that component of the radial distortion that cannot be adequately modeled in the mosaicing process), tangential distortion, and non-square pixel distortion, among others, causes the local mis-registrations which can be corrected for using the aforementioned method. The same procedures employed to reduce these types of distortion can be adapted to reduce the ghosting of close-in objects in a mosaiced image constructed from images taken with multiple cameras at different viewpoints. Essentially, this deghosting process involves computing the optical flow between all pairs of images, and inferring the desired local warps from these computations.

The foregoing deghosting technique is particularly useful in the context of generating panoramic video using a non-catadioptric, multi-camera panoramic video authoring system, when employed on a frame by frame basis. As mentioned previously, these types of authoring systems use a series of video cameras to capture a different part of the surrounding scene from a different viewpoint. In such a system, the images captured by the cameras at the same moment in time are stitched together to form a frame of the panoramic video. However, objects will typically move in and out of the scene and may come close enough to the camera rig to cause the aforementioned localized double image. Given this, each mosaiced frame of the panoramic video would be deghosted in accordance with the present technique to reduce the localized mis-alignments that are responsible for the ghosting.

A panoramic video is a video made up of a sequence of panoramic frames depicting a surrounding scene. Ideally, the panoramic video makes available a seamless, 360 degree, view of this scene. In this way, a person viewing the panoramic video can select different portions of the scene to view on a real-time basis. In other words, a person viewing the panoramic video on the proper viewer can electronically steer his or her way around in the scene as the video is playing.

A number of different systems for generating panoramic videos have been previously developed. For the most part, these systems employ a mirror arrangement to capture the surrounding scene. For example, one existing system, referred to as a catadioptric omnidirectional camera system, incorporates mirrors to enhance the field of view of a single camera. Essentially, this system uses a camera that images a hemispherical mirror to generate an panoramic still image with a 360°×210° field of view. Another similar mirrorbased (i.e. catadioptric) system unwarps a spherically distorted video produced by the mirror-and-camera rig into a rectangular video stream then encodes it using standard streaming authoring tools. The person viewing a video produced via this system sees a sub-region of the scene captured in the panoramic video and can pan within the scene. While these mirror-based single camera systems are capable of producing convincing panoramic stills and video, they suffer from a relatively low resolution and a fairly complex camera rig owing to the mirror arrangements.

Other current panoramic video systems attempt to overcome the resolution and complexity problems by foregoing the use of a mirror, and employing a multiple camera head instead. For example, one current system consists of six cameras mounted on the six faces of a 2-inch cube, resulting in a 360°×360° field of view. The system also provides post-processing software to stitch the video streams from the individual cameras into a panorama. This multi-camera system has higher resolution than the catadioptric systems described above, but has the disadvantage that the aforementioned localized ghosting occurs when close-in objects are captured in the video. This is because the cameras do not sharing a common center of projection.

Another non-catadioptric, multi-camera panoramic video authoring system that can benefit from the present deghosting technique is the subject of a co-pending application entitled "Panoramic Video" by the inventors of this application and assigned to the common assignee. The co-pending application was filed on Jul. 7, 2000 and assigned Ser. No. 09/611,646. The disclosure of this co-pending application is hereby incorporated by reference.

Essentially, this co-pending application describes the creation of a panoramic video that first entails acquiring multiple videos of the scene being depicted. The acquisition phase also includes a calibration procedure that provides information about the camera rig used to capture the videos that is used in the next phase for creating the panoramic video. This next phase, which is referred to as the authoring phase, involves mosaicing the individual videos together to form a single panoramic video. It is in this authoring phase that the techniques of the present deghosting process are employed to advantage.

A specialized camera rig is employed to capture a series of videos of the scene, which are used to create the panoramic video. The camera rig preferably consists of multiple digital video cameras that are disposed in a back to back fashion such that their lenses each point in a radially outward direction and view a different portion of the surrounding scene. The procedures used in the aforementioned authoring phase will work best if the lateral field of view of each camera overlaps by at least 20 percent. Thus, at least as many cameras as needed to provide a full 360 degree coverage of the scene including the desired overlaps would be employed.

The panoramic video is generated by first capturing videos of the surrounding scene using the cameras of the previously-described camera rig. Ideally, the cameras would have a synchronization feature by which each camera can be started at the same instant. In this way, the frame numbers of the frames captured by each camera will correspond. For example, the first frame captured by each camera will have been captured at approximately the same time, the second frame captured by each camera would have been captured at approximately the same time, and so on. It is important to know which frames where captured by the cameras at the same time because these corresponding frames will be stitched together into a panoramic image that will form one of the frames of the panoramic video. However, if the cameras do not possess a synchronization feature, an alternate procedure can be performed to find the frames captured by the cameras at the same time. In essence, the procedure involves recording a synchronizing event at the beginning of the recording process and using it to find the corresponding frames. The recording of the scene preferably continues until enough video is captured to produce the desired length panoramic video.

Once the videos that are to be made into the panoramic video have been captured, the frame number in each video that coincides with the recorded synchronization event (if present) is identified. The relative frame number offsets among the cameras is then computed. Once the frame offsets have been computed, the panoramic frames of the video are generated. This is done by selecting a starting frame from one of the videos. The previously computed offsets are then used to identify the corresponding frame in each of the other videos that was captured at approximately the same moment as the selected starting frame. The first frames identified in each video via the foregoing procedure are then stitched together, preferably using the mosaicing process of U.S. Pat. No. 6,018,349, entitled "Patch Based Alignment Method and Apparatus For Construction of Image Mosaics", and parameters saved in a calibration file created during the calibration of the camera rig. This same process is then repeated for the next consecutive frames in each video to produce each subsequent frame of the panoramic video, until the desired length panoramic video is produced, or there are no more frames left in any one of the videos.

However, there may be objects close in to the cameras in the videos making up the panoramic video that would result in a double image in one or more of the panorama video frames. Thus, it is advantageous to perform the deghosting technique according to the present invention at this point in the panoramic video creation process. Preferably, this is accomplished using the procedures described in the aforementioned U.S. Pat. No. 5,986,668.

This deghosting technique is preferably performed on each frame of the panoramic video as it is created. In other words, following the mosaicing of the corresponding frames of the individual videos captured by the cameras of the camera rig to create a frame of the panoramic video, a deghosting correction field is computed via the aforementioned process of U.S. Pat. No. 5,986,668. This correction field, which characterizes the local warping needed in each of the video frames making up the panoramic video frame, is then employed to reduce any ghosting associated with localized mis-registrations.

Figure 3A:
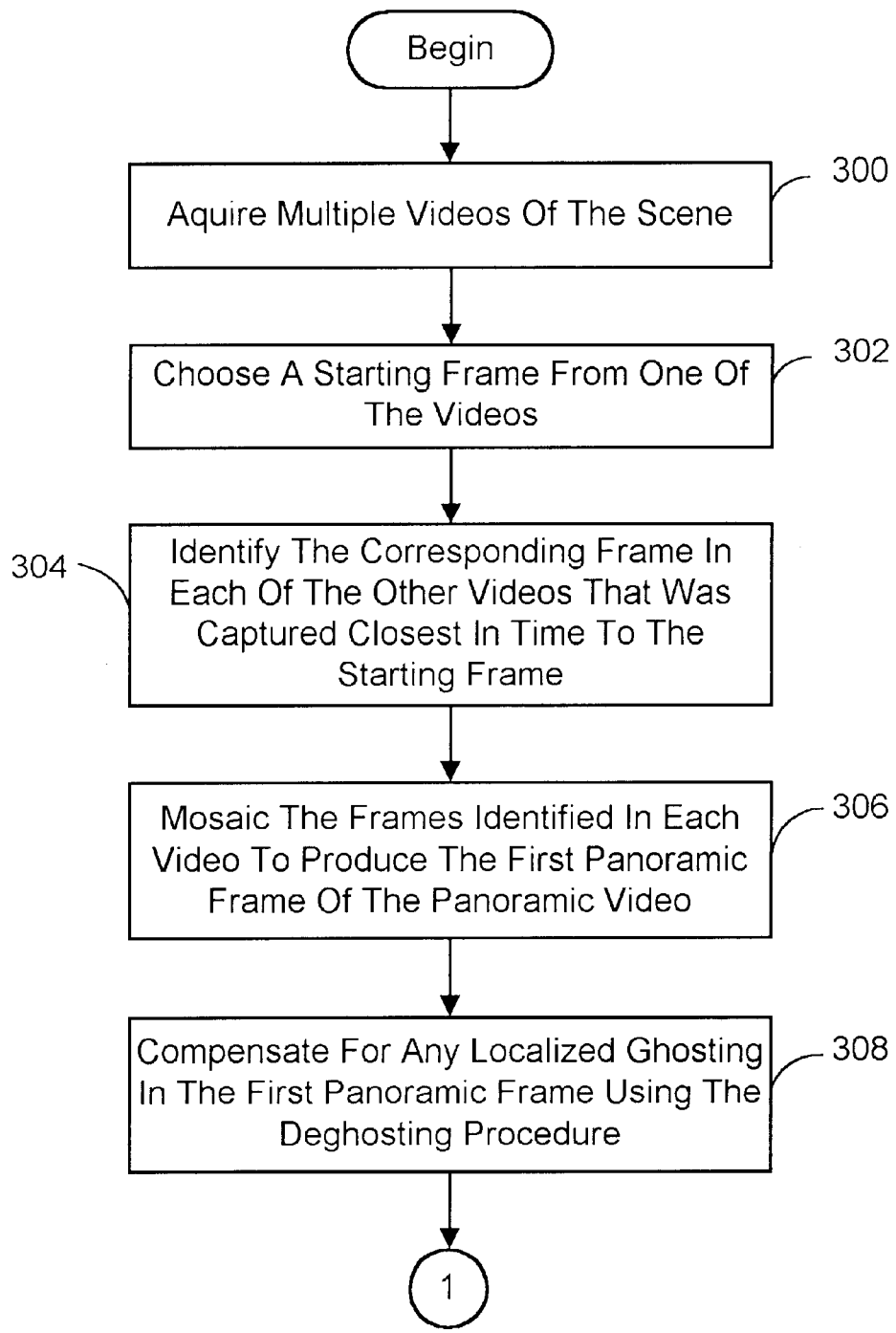
FIGS. 3A and 3B are a flow chart diagramming a process for generating a panoramic video that implements the deghosting technique of FIG. 2.
Figure 3B:
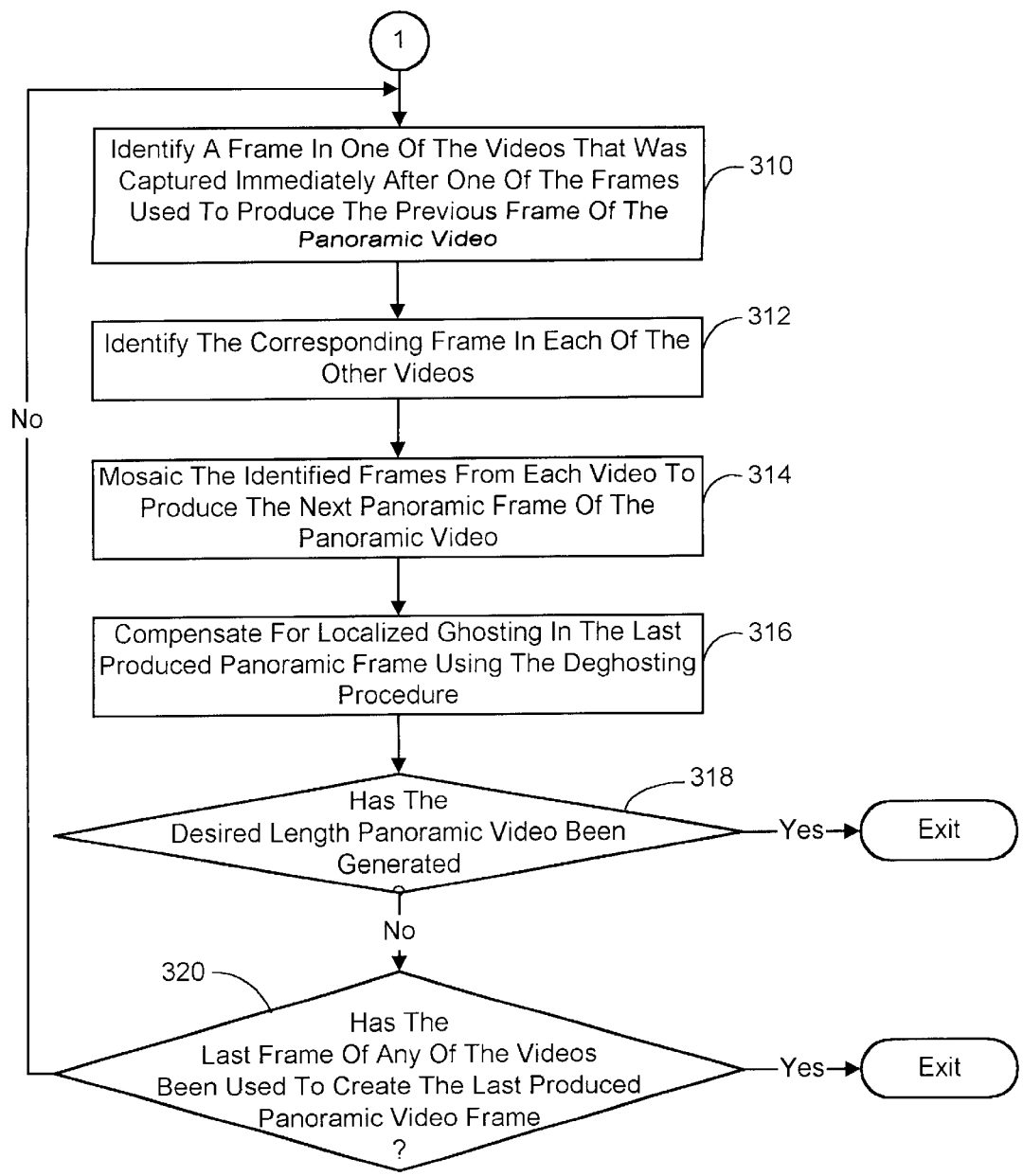

Referring to FIGS. 3A and 3B, a process implementing this deghosting of the frames of a panoramic video as they are created will be described. The process begins with the acquisition of multiple videos of the scene that is to become the subject of the panoramic video (process action 300). It is noted that each the these videos is captured substantially simultaneously using a separate camera. Next, one of the videos is selected and a starting frame is chosen from it (process action 302). The corresponding frame in each of the non-selected videos that was captured closest in time to the chosen starting frame is identified next, as indicated by process action 304. The frames identified in each of the videos are then mosaiced to form the first frame of the panoramic video (process action 306). Any localized ghosting in the first frame is then compensated for using the deghosting procedure discussed previously (process action 308). Next, a frame in one of the videos that was captured immediately after a frame used to form the last-produced frame of the panoramic video is selected (process action 310) and the corresponding frames in the other videos that were captured closest in time to the just selected frame are also selected (process action 312). The selected frame from each of the videos is mosaiced to form the next frame of the panoramic video, as indicated by process action 314. As with the first panoramic frame, any localized ghosting in the last-produced frame of the panoramic video is compensated for using the deghosting procedure (process action 316). Process actions 310 through 316 are then repeated until either the desired length panoramic video is generated (process action 318) or the last-produced frame of the panoramic video was formed using in part the last frame of one of the videos (process action 320).

While the invention has been described in detail by specific reference to preferred embodiments thereof, it is understood that variations and modifications thereof may be made without departing from the true spirit and scope of the invention.

Wherefore, what is claimed is:

1. A computer-readable memory for generating a panoramic video of a scene, comprising:
    a computer-readable storage medium; and
    a computer program comprising program modules stored in the storage medium, wherein the storage medium is so configured by the computer program that it causes a computer to,
    (a) acquire multiple videos of the scene, said videos having been captured simultaneously using a separate camera from a different viewpoint within the scene;
    (b) select one of the videos and choosing a starting frame from the selected video;
    (c) identify the corresponding frame in each of the nonselected videos that was captured closest in time to the chosen starting frame;
    (d) mosaic the chosen starting frame and the identified corresponding frames to form the first frame of the panoramic video;
    (e) deghost the first frame of the panoramic video;
    (f) select a frame in one of the videos that was captured immediately after a frame used to form the last-produced frame of the panoramic video;
    (g) select the corresponding frame in each of the other videos that was captured closest in time to the previously selected frame;
    (h) mosaic the selected frames to form a next frame of the panoramic video;
    (i) deghost the last-produced frame of the panoramic video; and
    (j) repeat process actions (f) through (i) until either the desired length panoramic video is generated or the last-produced frame of the panoramic video was formed using in part the last frame of one of the videos.

2. The computer-readable memory of claim 1, wherein the program module for deghosting the first frame of the panoramic video comprises sub-modules for:
    computing a deghosting correction field that characterizes the local warping needed in each of the individual frames of the multiple videos making up the first panoramic frame to reduce any double imaging associated with localized mis-registrations therein; and
    employing the computed deghosting correction field to reduce any double imaging in the first frame of the panoramic video.

3. The computer-readable memory of claim 1, wherein the program module for deghosting the last-produced frame of the panoramic video comprises sub-modules for:
    computing a deghosting correction field that characterizes the local warping needed in each of the individual frames of the multiple videos making up the last-produced panoramic frame to reduce any double imaging associated with localized mis-registrations therein; and
    employing the computed deghosting correction field to reduce any double imaging in the last-produced frame of the panoramic video.

4. A computer-implemented process for generating a panoramic video of a scene, comprising using a computer to perform the following process actions:
    (a) acquiring multiple videos of the scene, said videos having been captured simultaneously using a separate camera from a different viewpoint within the scene;
    (b) selecting one of the videos and choosing a starting frame from the selected video;
    (c) identifying the corresponding frame in each of the nonselected videos that was captured closest in time to the chosen starting frame;
    (d) mosaicing the chosen starting frame and the identified corresponding frames to form the first frame of the panoramic video;
    (e) deghosting the first frame of the panoramic video;
    (f) selecting a frame in one of the videos that was captured immediately after a frame used to form the last-produced frame of the panoramic video;
    (g) selecting the corresponding frame in each of the other videos that was captured closest in time to the previously selected frame;
    (h) mosaicing the selected frames to form a next frame of the panoramic video;
    (i) deghosting the last-produced frame of the panoramic video; and
    (j) repeating process actions (f) through (i) until either the desired length panoramic video is generated or the last-produced frame of the panoramic video was formed using in part the last frame of one of the videos.

5. The process of claim 4, wherein the process action of deghosting the first frame of the panoramic video, comprises the actions of:
    computing the optical flow between each pair of said overlapping images of the scene used to construct the mosaic image; and
    warping each image based on the computed optical flows.

6. The process of claim 4, wherein the process action of deghosting the last-produced frame of the panoramic video, comprises the actions of:
    computing the optical flow between each pair of said overlapping images of the scene used to construct the mosaic image; and
    warping each image based on the computed optical flows.

7. A system for generating a panoramic video of a surrounding scene, comprising:
    a camera rig comprising multiple video cameras disposed so as to view different portions of the scene, but wherein the field of view of each camera overlaps that of each adjacent camera;
    a general purpose computing device; and
    a computer program comprising program modules executable by the computing device, wherein the computing device is directed by the program modules of the computer program to,
    (a) acquire multiple videos of the scene, said videos having been captured simultaneously using said camera rig;

(b) select one of the videos and choosing a starting frame from the selected video;

(c) identify the corresponding frame in each of the nonselected videos that was captured closest in time to the chosen starting frame;

(d) mosaic the chosen starting frame and the identified corresponding frames to form the first frame of the panoramic video;

(e) deghost the first frame of the panoramic video;

(f) select a frame in one of the videos that was captured immediately after a frame used to form the last-produced frame of the panoramic video;

(g) select the corresponding frame in each of the other videos that was captured closest in time to the previously selected frame;

(h) mosaic the selected frames to form a next frame of the panoramic video;

(i) deghost the last-produced frame of the panoramic video; and (j) repeat process actions (f) through (i) until either the desired length panoramic video is generated or the last-produced frame of the panoramic video was formed using in part the last frame of one of the videos.

8. The system of claim 7, wherein the program module for deghosting the first frame of the panoramic video, comprises sub-modules for:

computing the optical flow between each pair of said overlapping images of the scene used to construct the mosaic image;

inferring from the optical flow computations the local warps needed in each of said overlapping images to reduce double imaging associated with localized mis-registrations, and warping each overlapping image using the inferred local warps to reduce double imaging in the mosaiced image.

9. The system of claim 7, wherein the program module for deghosting the last-produced frame of the panoramic video, comprises sub-modules for:

computing the optical flow between each pair of said overlapping images of the scene used to construct the mosaic image;

inferring from the optical flow computation the local warps needed in each of said overlapping images to reduce double imaging associated with localized mis-registrations, and warping each overlapping image using the inferred local warps to reduce double imaging in the mosaiced image.

* * * * *